Dec. 18, 1934.  A. VON ENGEL ET AL  1,985,003
SPEED CONTROL
Filed May 27, 1933
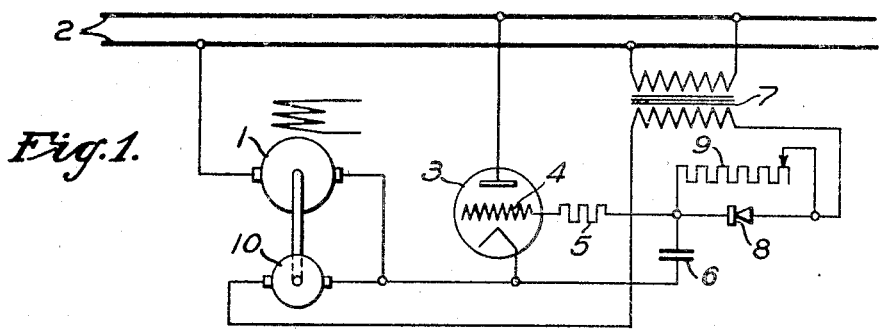
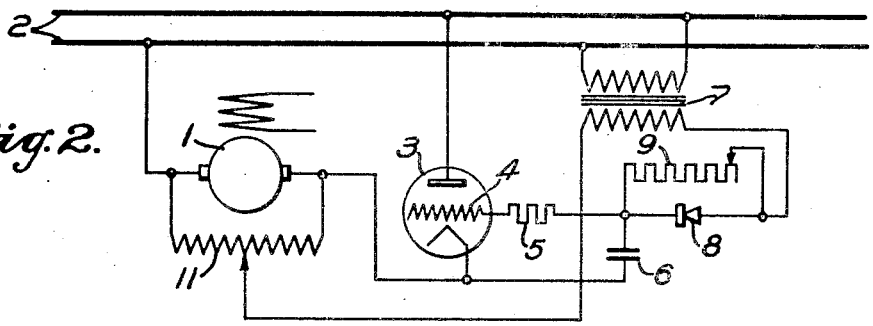
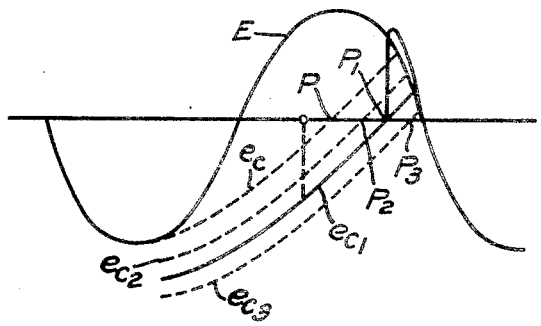
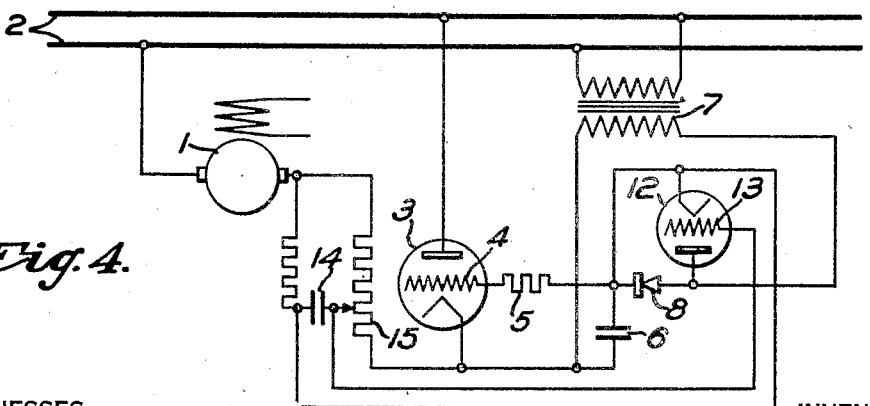
WITNESSES:
R. J. Fitzgerald
S. A. Stricklett
INVENTORS.
Alfred Von Engel,
Reinhold Rudenberg and
Rudolf G. Berthold.
BY O. B. Buchanan
ATTORNEY Patented Dec. 18, 1934

1,985,003

UNITED STATES PATENT OFFICE 1,985,003

SPEED CONTROL

Alfred von Engel, Rudolf G. Berthold, Berlin-Siemensstadt, and Reinhold Rüdenberg, Berlin-Grunewald, Germany, assignors to Westinghouse Electric & Manufacturing Company, East Pittsburgh, Pa., a corporation of Pennsylvania Application May 27, 1933, Serial No. 673,202
In Germany June 18, 1932

7 Claims. (Cl. 171—312)

Our invention relates to a control system and particularly to a device for securing constant motor speed regardless of the motor load.

It has been heretofore proposed to control the speed or other characteristics of a motor by means of a grid controlled rectifier which permits current flow only for a predetermined portion of the cycle of the supply current. Such motors have an inherent disadvantage in that the speed varies greatly with the load.

It is an object of our invention to provide a control system which will automatically shift the ignition point of the supplying rectifier according to the magnitude of the load impressed on the motor.

In a control system according to our invention, the usual control potential is modified by a potential dependent upon the speed or other load characteristic of the motor involved.

It is a further object of our invention to provide an adjustable speed motor, the speed of which can be maintained over a wide range of loads by substantially automatic control means.

Other objects and advantages will be apparent from the following detailed description taken in conjunction with the accompanying drawing, in which Figure 1 is a schematic view of a system embodying our invention, Fig. 2 is a similar view showing a modification, Fig. 3 is a diagrammatic illustration of the current and voltage relations in the motor and the control system, and Fig. 4 is a further modification of our control device.

In apparatus according to our invention, a direct current motor 1 is supplied with current from an alternating current circuit 2 by means of a controlled rectifying device 3. The control element, such as a grid 4 in the rectifying device 3, is connected through a resistor 5 to a capacitor 6 which may supply blocking potential to the control element 4.

The blocking condenser 6 is charged from a suitable alternating current source, such as a transformer 7 through a suitable rectifying device 8. A resistor 9 is placed in shunt with the rectifying device 8 so that the blocking potential of the capacitor 6 may be discharged. If the condenser 6 is charged only by the transformer 7, the condenser potential will be that shown by the curve $e_c$ of Fig. 3.

The steepness of this curve $e_c$ and consequently the ignition point P of the rectifying device may be varied by varying the resistance of the shunt 9 about the charging rectifier 8. When the blocking potential is supplied only by the transformer 7 the charge on capacitor 6 is constant and the rectifier 3 has a constant ignition point and consequently the motor supplied by the rectifier 3 would have a varying speed characteristic with load.

In the device according to our invention, however, the potential of the blocking condenser 6 is modified according to the speed of the motor being controlled. A suitable source of auxiliary potential, such as a tachometer generator 10, driven by the controlled motor 1 is connected in series with the alternating current source utilized to charge the blocking condenser 6. Consequently, the charge on the blocking condenser 6 varies with the magnitude of the voltage inducted by the tachometer generator 10 which, in turn, varies with the speed of the driving motor 1.

At normal speed the blocking potential is $e_c$ plus the voltage of the generator 10 producing the control potential shown at $e_{c1}$ providing normal ignition at $P_1$.

If the load on the motor should increase thereby decreasing the speed, the voltage produced by the auxiliary generator 10 will be decreased, thereby decreasing the charge $e_{c2}$ on the blocking condenser 6 and effectively displacing the ignition point to $P_2$ in the controlled rectifier 3.

If, on the other hand, the load on the motor 1 should decrease, the speed of the auxiliary generator 10 and consequently its voltage would be increased and thereby increase the charge $e_{c3}$ on the blocking condenser 6 which would shift the ignition point to $P_3$ to reduce the current delivered by the controlled rectifier 3.

In the modification shown in Fig. 2, the tachometer generator 10 has been replaced by a potentiometer 11 across the armature of the controlled motor 1. As the speed of the motor 1 increases, the armature voltage increases and consequently the auxiliary voltage supplied across the potentiometer 11 is increased. On the other hand, as the motor is loaded, the armature voltage decreases thereby decreasing the auxiliary potential supplied by the potentiometer 11 and increasing the time interval in which the controlled rectifier 3 delivers current.

In the modification according to Fig. 4, the discharge of the blocking condenser 6 is effected by an auxiliary controlled rectifier 12, the auxiliary rectifier being, in turn, controlled by the load on the motor. The control grid 13 of the auxiliary rectifier 12 is controlled by a potential stored in a suitable condenser 14 connected across a resistor 15 in the load circuit of the motor 1.

The positive charge on the capacitor 14 varies with the current through the resistor 15. The greater the charge on capacitor 14 the earlier in the cycle the auxiliary discharge device is released which in turn releases the grid 4 of the main rectifier 3.

While we have shown and described specific forms of our invention, it is apparent that changes and modifications can be made therein without departing from the spirit and scope of our invention. We desire therefore that such limitations be imposed as are embodied in the accompanying claims or as may be necessitated by the prior art.

We claim as our invention:

1. A constant speed drive comprising a direct current motor, a controlled electric valve for supplying current to said motor, a control element in said valve, a source of control potential for said control element comprising a source of alternating current, a condenser connected to said control element, a rectifying element for supplying a blocking charge to said condenser from said alternating current source, means for discharging said blocking potential, a generator driven by said motor, said generator supplying current to said condenser for varying the time of discharge thereof.

2. A control system for a grid controlled rectifier comprising a source of alternating current, a condenser for supplying control potential to the grid of the rectifier, an auxiliary rectifier for supplying blocking potential to said condenser from said alternating current source, an auxiliary grid controlled discharge device connected in parallel with the first mentioned auxiliary rectifier for discharging said blocking potential and a source of potential variable with the load for controlling said discharge device.

3. A speed control system comprising a direct current motor, an alternating current supply for the motor, a grid controlled valve for supplying current to said motor, a connection from said alternating current supply to said grid, a source of potential variable with the load condition of said motor, a connection for impressing said potential on said grid, a condenser connected to said grid, an auxiliary rectifier for charging said condenser and means in parallel with the auxiliary rectifier for discharging said condenser.

4. A motor control system comprising an alternating current supply system, a direct current motor, a grid controlled valve for delivering current from said supply to said motor, a transformer connected to said supply system, a source of potential variable with motor load, a connection for simultaneously impressing said voltages on the grid, a condenser charged by said combined potentials to block the grid, an auxiliary rectifier for retaining the charge on said condenser and means for discharging said condenser.

5. A motor control system comprising an alternating current system, a direct current motor, a valve for supplying unidirectional current to said motor, a control grid in said valve, a source of alternating current for supplying control potential to said grid, a source of potential variable with the load on said motor for modifying the output potential of said source, a condenser connected to said grid, an auxiliary rectifier for impressing said modified potential on said condenser and means for discharging said condenser.

6. A control system comprising a direct current load, an alternating current supply system, an arc discharge device for supplying power to said load from said system, a control element in said discharge device, a source of control potential, a second source of control potential variable with the load, said second source being connected to said first source for modifying the output potential thereof, a condenser connected to said control element, an auxiliary rectifier for impressing the modified potential on said condenser to block the discharge device, means for discharging the condenser to release the discharge device, said means being adjustable to vary the load characteristic.

7. A speed control system for a direct current motor fed from an alternating current source comprising an arc discharge device for transferring power from said source to said motor, a grid in said discharge device, a condenser connected to said grid, an alternating current source for supplying control potential, a second source of control potential variable with the speed of the motor, means for modifying said first control potential with said second control potential, an auxiliary rectifier for charging said condenser from said modified control potential, means for discharging said condenser, said discharge means being adjustable to vary the speed of said motor.

ALFRED v. ENGEL.
RUDOLF G. BERTHOLD.
REINHOLD RÜDENBERG.